Figure 1A:
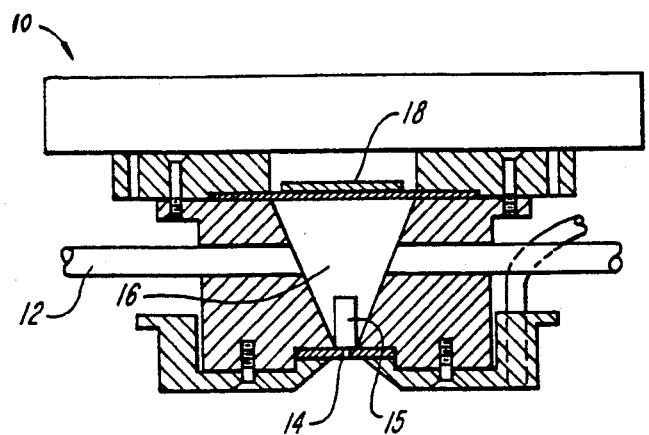
Figure 1B:
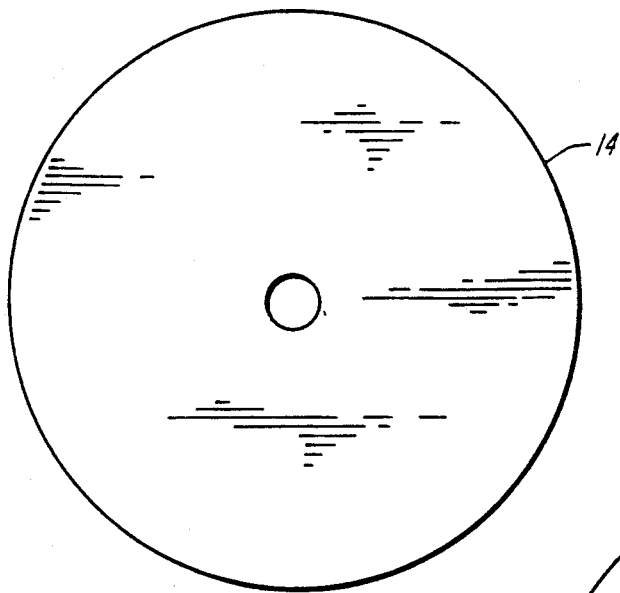
Figure 1C:
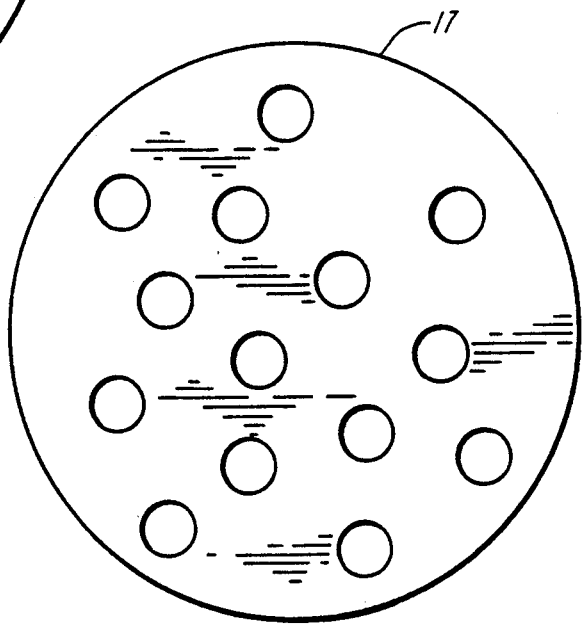

United States Patent [19]

Levendis et al.

[11] Patent Number: 5,269,980
[45] Date of Patent: Dec. 14, 1993

[54] PRODUCTION OF POLYMER PARTICLES IN POWDER FORM USING AN ATOMIZATION TECHNIQUE

[75] Inventors: Yiannis A. Levendis, Boston; Thomai Panagiotou, Brookline, both of Mass.; Richard Flagan, La Crescenta, Calif.

[73] Assignee: Northeastern University, Boston, Mass.

[21] Appl. No.: 740,507

[22] Filed: Aug. 5, 1991

[51] Int. Cl.$^5$ .............................. B29B 9/10
[52] U.S. Cl. .......................... 264/9; 264/5; 264/13
[58] Field of Search .................. 264/5, 9, 13

[56] References Cited

U.S. PATENT DOCUMENTS

| | | | |
|---|---|---|---|
| 2,379,237 | 6/1945 | Jenkins | 260/37 |
| 2,595,852 | 5/1952 | Hopper | 260/78.4 |
| 2,790,201 | 4/1957 | Eilbracht et al. | 264/13 |
| 2,968,833 | 1/1961 | DeHaven et al. | 264/9 |
| 3,060,510 | 10/1962 | Fischer et al. | 264/9 |
| 3,194,781 | 7/1965 | Hodberg et al. | 260/33.6 |
| 3,203,916 | 8/1965 | Veet | 260/23.7 |
| 3,215,663 | 11/1965 | Weisberg | 260/41 |
| 3,372,153 | 3/1968 | Turner et al. | 260/92.1 |
| 3,373,232 | 3/1968 | Wise et al. | 264/9 |
| 3,397,258 | 8/1968 | Williams | 264/9 |
| 3,422,049 | 1/1969 | McClain | 260/29.6 |
| 3,431,249 | 3/1969 | Bohrer et al. | 260/93.7 |
| 3,561,003 | 2/1971 | Lanham et al. | 106/22 |
| 3,579,721 | 5/1971 | Kaltenbach | 264/9 |
| 3,719,733 | 3/1973 | Rakestraw et al. | 264/9 |
| 3,895,035 | 7/1975 | Berg et al. | 260/33.6 |
| 3,896,196 | 7/1975 | Dickey et al. | 264/6 |
| 3,923,707 | 12/1975 | Berg et al. | 260/17 R |
| 3,929,934 | 12/1975 | Moore et al. | 260/884 |
| 3,968,319 | 7/1976 | Mani et al. | 428/511 |
| 3,970,633 | 7/1976 | Miller et al. | 260/42.29 |

(List continued on next page.)

FOREIGN PATENT DOCUMENTS

0173518 3/1986 European Pat. Off. ............ 264/9

OTHER PUBLICATIONS

Promotional flyer published by the National Institute of Standards and Technology in Gaithersburg, MD, offering for sale units of SRM 1960.

Levendis, Yiannis A., and Flagan, Richard C., "Combustion of Uniformly Sized Glassy Carbon Particles," *Combust. Sci. and Tech.*, 1987, vol. 53, pp. 117-136.

Levendis, Yiannis A., and Flagan, Richard C., "Synthesis, Formation and Characterization of Micro-Sized Glassy Carbon Spheres of Controlled Pore Structure," *Carbon*, vol. 27, No. 2, pp. 265-283.

*Primary Examiner*—Mary Lynn Theisen
*Attorney, Agent, or Firm*—Weingarten, Schurgin, Gagnebin & Hayes

[57] ABSTRACT

A process for producing spherical polymer particles which may be either monodisperse of a predetermined and controlled size, or polydisperse, using a liquid atomization technique. The process includes an aerosol generator to create a stream or multiple streams of liquid droplets sprayed into a thermal reactor. The aerosol generator sprays the feed solution which comprises liquid organic monomers or semi-polymerized monomers, a polymerization catalyst and optionally, a solvent, into the thermal reactor environment. The solvent evaporates allowing polymerization reactions to commence. Polymerization may proceed by a variety of methods. Polymerization is completed during the flight-time of the droplets and the solid polymer particles are collected at the bottom of the reactor. The size of the particles in every batch may be predetermined and controlled by fine tuning the aerosol generator's configuration or operational parameters to adjust the size of the droplets of the feed solution being sprayed into the reactor. In one variation, the feed solution to the aerosol generator may be a polymer dissolved in an appropriate solvent. The aerosol generator then sprays the polymer solution in the thermal reactor to generate particles by evaporating the solvent.

38 Claims, 6 Drawing Sheets

U.S. PATENT DOCUMENTS

| | | | |
|---|---|---|---|
| 3,993,857 | 11/1976 | Smolinski et al. | 528/502 |
| 3,998,778 | 12/1976 | Berg et al. | 260/33.6 |
| 4,052,544 | 10/1977 | Kehl et al. | 526/102 |
| 4,076,883 | 2/1978 | Dittrich | 428/242 |
| 4,158,092 | 6/1979 | Botsch et al. | 528/500 |
| 4,185,001 | 1/1980 | Machurat et al. | 260/42.37 |
| 4,206,161 | 6/1980 | Sato et al. | 264/11 |
| 4,212,837 | 7/1980 | Oguchi et al. | 264/15 |
| 4,219,444 | 8/1980 | Hill et al. | 252/435 |
| 4,230,832 | 10/1980 | Wei | 525/260 |
| 4,278,576 | 7/1981 | Goldman | 260/23 AR |
| 4,289,863 | 9/1981 | Hill | 526/106 |
| 4,311,580 | 1/1982 | Bartholic | 208/91 |
| 4,328,091 | 5/1982 | Bartholic | 208/91 |
| 4,346,182 | 8/1982 | Gagliani et al. | 521/189 |
| 4,348,301 | 9/1982 | Crompton et al. | 252/313 R |
| 4,397,968 | 8/1983 | Eck et al. | 523/305 |
| 4,397,971 | 8/1983 | Hocker et al. | 524/40 |
| 4,427,538 | 1/1984 | Bartholic | 208/127 |
| 4,446,009 | 5/1984 | Bartholic | 208/113 |
| 4,460,572 | 7/1984 | Derby et al. | 424/78 |
| 4,504,529 | 3/1985 | Sorensen et al. | 427/437 |
| 4,518,738 | 5/1985 | Sorensen et al. | 524/435 |
| 4,519,939 | 5/1985 | Hecker et al. | 252/500 |
| 4,532,295 | 7/1985 | Brabetz et al. | 524/827 |
| 4,537,805 | 8/1985 | Lin et al. | 427/54.1 |
| 4,542,184 | 9/1985 | Eck et al. | 524/827 |
| 4,560,724 | 12/1985 | Brabetz et al. | 524/734 |
| 4,613,639 | 9/1986 | Blum et al. | 524/251 |
| 4,617,327 | 10/1986 | Podszun | 523/116 |
| 4,711,748 | 12/1987 | Irwin et al. | 264/117 |
| 4,801,411 | 1/1989 | Wellinghoff et al. | 264/7 |
| 4,863,646 | 9/1989 | Watanabe et al. | 264/15 |
| 4,871,489 | 10/1989 | Ketcham | 264/9 |
| 4,906,699 | 3/1990 | Siol et al. | 525/297 |
| 4,923,776 | 5/1990 | Hedvall et al. | 430/111 |
| 4,929,400 | 5/1990 | Rembaum et al. | 264/10 |
| 4,999,225 | 3/1991 | Rotolico | 427/423 |
| 5,008,036 | 4/1991 | Crompton et al. | 252/313.1 |
| 5,015,423 | 5/1991 | Eguchi et al. | 264/9 |

PRODUCTION OF POLYMER PARTICLES IN POWDER FORM USING AN ATOMIZATION TECHNIQUE

FIELD OF THE INVENTION

This invention relates generally to polymers, and more particularly to methods of producing polymers in powder form by atomization techniques.

BACKGROUND OF THE INVENTION

Polymer particles in the form of powders are of great importance in a variety of areas including plastics, membrane coatings, films, drug manufacture, biomedical engineering and instrument manufacture. More particularly, polymer powders comprising spherical and monodisperse particles of a predetermined size can be used in fundamental studies of materials and physics, as well as in calibration of scientific instruments.

The keen interest in these spherical and monodisperse size-controlled polymer particles is exemplified by attempts to produce them aboard the space shuttle Columbia during two different missions. In these space shuttle experiments, large latex particles were grown by emulsion polymerization under gravity-free conditions. "MADE IN SPACE, SRM 1960: 10-MICROMETER POLSTYRENE SPHERES", Office of Standard Reference Materials, Room B-311, Chemistry Bldg., National Inst. of Standards & Technology, Gaithersburg, Md. 20899.

In the past, a number of methods have been used to produce polymers. For example, one method includes polymerization in bulk. This process is not well controlled. Furthermore, the product may not be homogeneous.

Another process is emulsion or suspension polymerization, where polymer particles are obtained by evaporating the suspension agent. This process is also not easy to control and is slow. Furthermore, the particles obtained are not pure as they contain surfactants.

In another prior process, particles are created by gaseous reactions and homogeneous nucleation. This process is complicated and very sensitive to adverse conditions, and may result in fine particles only.

It would be advantageous to produce spherical, and monodisperse polymer particles of a predetermined and controlled size, or polydisperse polymer particles quickly and inexpensively.

SUMMARY OF THE INVENTION

The present invention relates to a process for preparing spherical polymer particles, either monodisperse of predetermined and controlled size, or polydisperse, by atomizing liquid precursors.

Figure 3A:
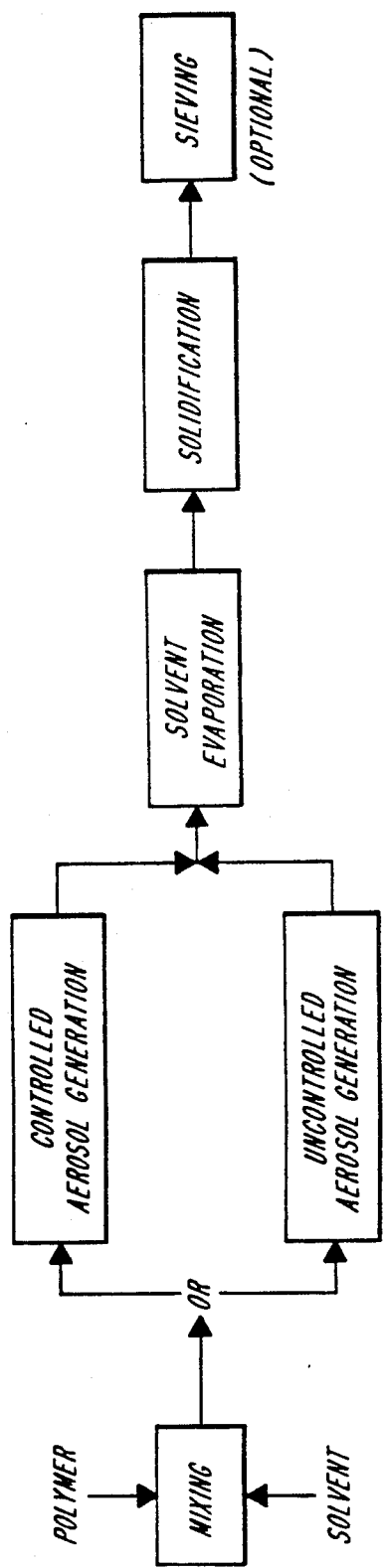

The process includes an aerosol generator to create a stream or multiple streams of liquid droplets sprayed into a thermal reactor. The liquid feed to the generator consists of an organic monomer or monomers which may be prepolymerized, a polymerization agent such as a polymerization catalyst or initiator, and optionally, a solvent.

The aerosol generator sprays the feed solution into the thermal reactor environment, and the solvent evaporates allowing polymerization reactions to commence.

Polymerization may proceed by a variety of methods such as condensation and addition polymerization, or other thermal reactions related to polymerization such as crosslinking. Polymerization is completed during the flight-time of the droplets and the solid polymer particles are collected at the bottom of the reactor.

The particle sizes may be predetermined and controlled by fine tuning the aerosol generator's configuration and operating parameters to adjust the size of the droplets of the feed solution being sprayed into the reactor.

In one variation, the feed solution to the aerosol generator may be a polymer dissolved in an appropriate solvent The aerosol generator then sprays the polymer solution in the thermal reactor to generate particles by simply evaporating the solvent.

DESCRIPTION OF THE DRAWINGS

The invention will be more fully understood from the following detailed description taken in conjunction with the accompanying drawings in which:

FIG. 1*a* is a schematic of the acoustically excited aerosol generator used in the process of the present invention;

FIG. 1*b* is an enlarged view of a single-orifice plate which may be used in conjunction with the aerosol generator shown in FIG. 1*a;*

FIG. 1*c* is an enlarged view of a multi-orifice plate which may be used in conjunction with the aerosol generator shown in FIG. 1*a;*

FIG. 2 is a schematic of a two stage thermal reactor used in the process of the present invention;

FIG. 3*a* is a flow diagram of the process of the present invention;

FIG. 3*b* is a flow diagram of a variation of the process of the present invention;

FIG. 4*a* is an SEM micrograph of polystyrene particles produced in accordance with the present invention (×1000);

FIG. 4*b* is an SEM micrograph of polystyrene particles produced in accordance with the present invention (×500);

FIG. 5 is an SEM micrograph of poly(methyl-methacrylate) particles produced from methyl-methacrylate monomer precursor in accordance with the present invention (×800); and FIG. 6 is a SEM micrograph of poly(vinyl-acetate) particles produced from vinyl acetate monomer precursor in accordance with the present invention (×625).

DETAILED DESCRIPTION OF THE INVENTION

Referring to FIGS. 3*a* and 3*b,* spherical monodisperse or polydisperse polymer particles are produced in accordance with the process of the present invention which comprises the steps of preparing a liquid feed solution of either mixtures of liquid organic monomers and polymerization catalysts which may optionally be pre-polymerized, or polymers dissolved in solvents; conducting the liquid feed solution into an aerosol generator; generating either a controlled or uncontrolled aerosol in the form of droplets; spraying the liquid feed solution from the aerosol generator into a thermal reactor heated to a predetermined temperature profile; maintaining the spray of the liquid feed solution in the thermal reactor for an optimum period of time to allow any solvent to evaporate and any monomers to polymerize; collecting the resultant solid polymerized particles at the bottom of the thermal reactor; and optionally sieving the collected particles.

In one embodiment (FIG. 3a), the liquid feed solution may comprise any polymer that can be completely dissolved in solvents. Examples of such polymers include but are not limited to poly(styrene), poly(methyl-methacrylate), poly(methyl-ethacrylate), acrylic resins, poly(vinyl-acetate), poly(butadiene), poly(esters) (uncrosslinked), formaldehyde resins, gelatins, proteins, poly(ethylene-terephthalate), and poly(vinyl-chloride), dissolved in a suitable solvent such as toluene, acetone, benzene, acids, butanone, water, methanol, ethanol and hexane.

Figure 3B:
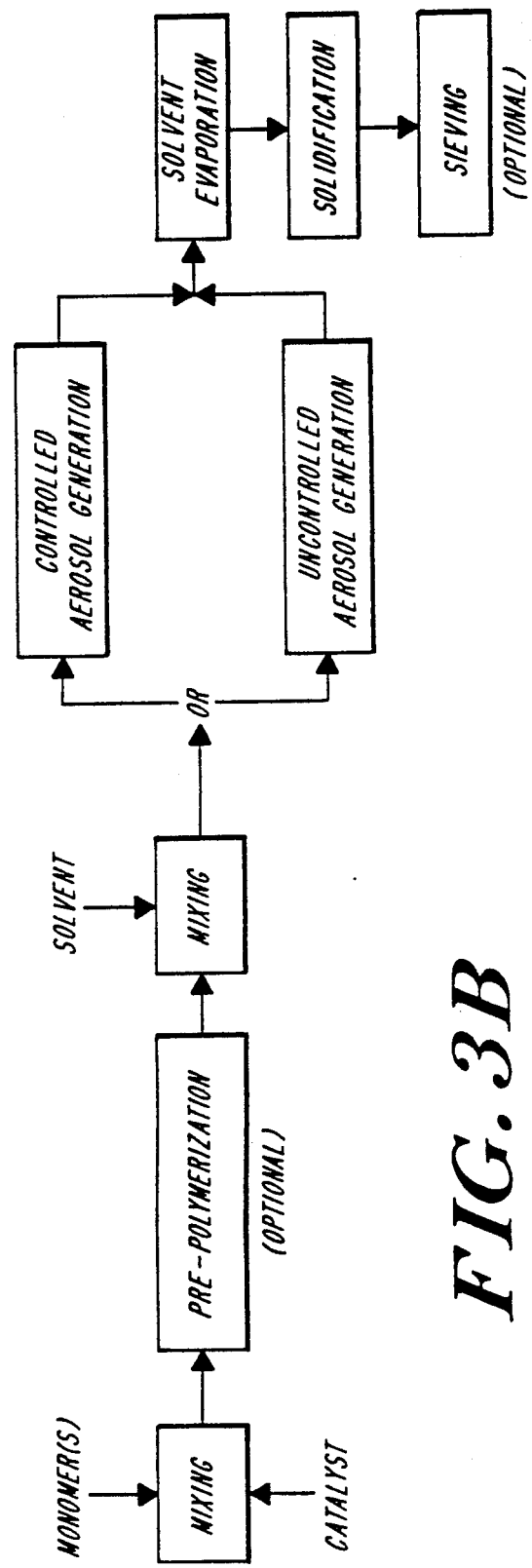

In another embodiment (FIG. 3b), the liquid feed solution may comprise liquid monomers including a polymerization catalyst or initiator dissolved in a suitable solvent. Suitable monomers include but are not limited to monomers of styrene, methyl methacrylate, acrylic acids, vinyl acetate, divinyl benzene, or any liquid monomer or mixtures thereof whose polymerization can be achieved in bulk and can be readily controlled. The monomers may be mixed with a solution of polymerization initiator such as benzoyl peroxide, or potassium persulfate. Optionally, the monomers may be pre-polymerized in bulk and dissolved in a suitable solvent before being conducted to the aerosol generator.

Figure 2:
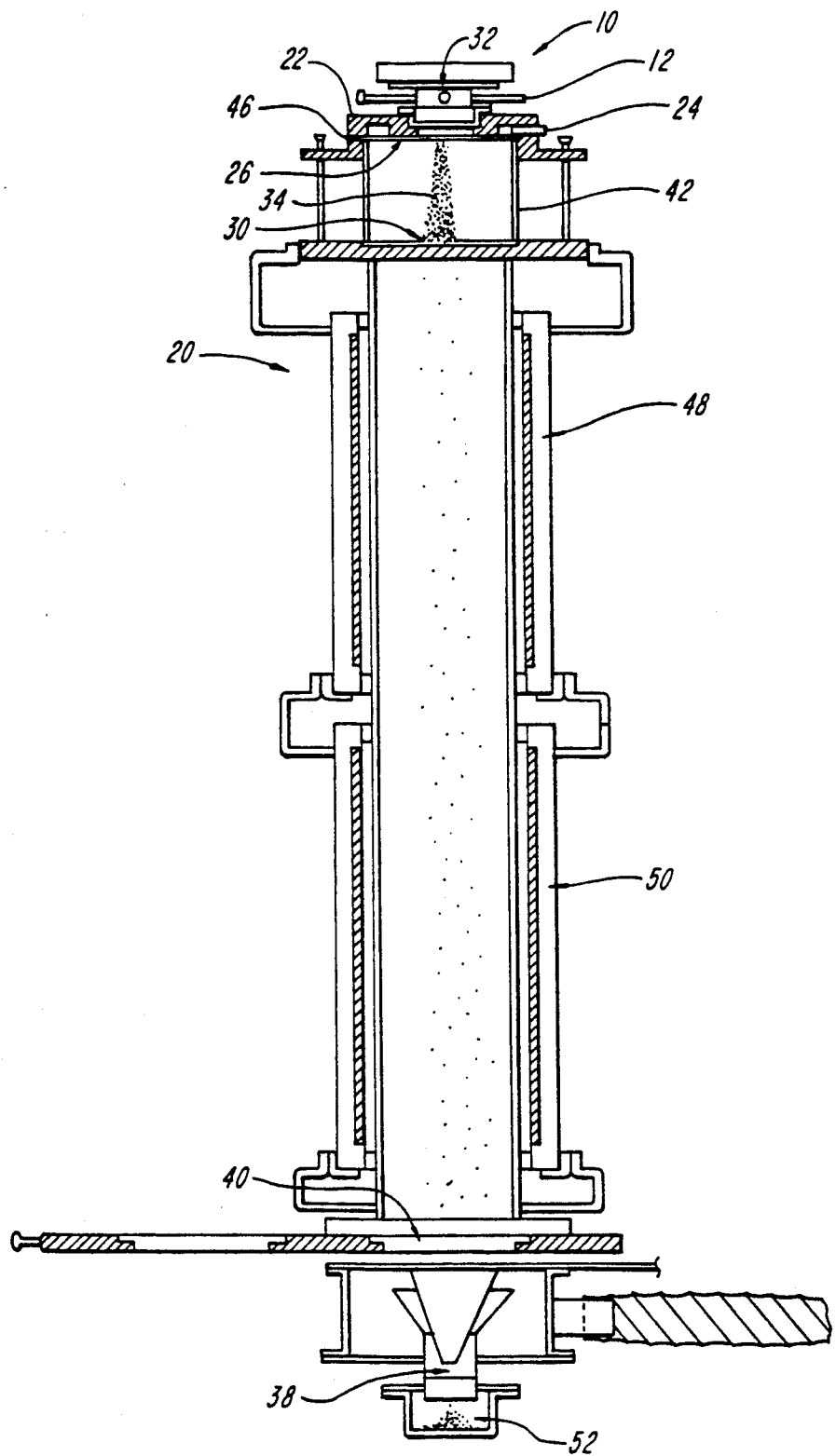

The liquid feed solution is then conducted into an aerosol generator. An example of a suitable aerosol generator is shown in FIGS. 1a and 2. The aerosol generator 10 shown in FIGS. 1a and 2, was constructed by the inventors. However, other commercially available aerosol generators having a high flowrate and incorporating provisions for droplet size control may be suitable for the practice of the present invention.

The aerosol generator 10 may be adjusted to generate a controlled or uncontrolled size aerosol containing spherical and monodisperse or polydisperse drops, respectively, of the feed solution.

In the aerosol generator 10, the liquid feed solution enters through a liquid inlet 12 and the liquid is forced through a small orifice in the orifice plate 14. The orifice plate 14 is shown in greater detail in FIG. 1*b*. Alternatively, the yield of the particles may be enhanced per unit time by fitting the orifice plate 14 with a multi-orifice plate 17 as shown in FIG. 1*b*. If monodispersend particles are to be produced, the liquid in the generator's cavity 16 is concurrently oscillated at a high frequency using a piezoelectric transducer 18. The vibration creates an instability which leads to the break-up of the liquid jet into an aerosol comprising uniformly-sized droplets. The size of the droplets may be controlled by the size of the orifice, the oscillator frequency and the liquid feed rate. Thus, the size of the dried monodipersed polymerized particles depends on all of the above parameters in addition to the degree of dilution of the polymer (mass fraction of solvent).

The production of polydisperse particles does not usually require controlled aerosol generation or that the liquid jet be vibrated as discussed above for monodisperse particles.

A small tube 15 may be inserted prior to the orifice of the present configuration to prevent plugging by any existing impurites. Also, an optional filter may be used in-line before the generator to further prevent impurities from entering the generator and plugging the orifice.

The droplets are sprayed into a thermal reactor 20 as an aerosol 34 where the droplets are dried and, if necessary, polymerization is completed to form solid spherical polymer particles 52 which are collected at the bottom of the thermal reactor 20. Polymerization may be completed by a variety of polymerization methods such as chain and step polymerization or condensation polymerization. Other reactions related to polymerization can also be facilitated such as crosslinking.

In a preferred embodiment, the thermal reactor 20 may be an externally heated two stage thermal reactor having an upper section 48 and a lower section 50. The upper section may be independently heated to a temperature which is different from that of the lower section and vice versa. The aerosol generator 10 is placed at the top of the reactor 20 on a special flange 22 which provides for the introduction of dilution gas 24. The dilution gas is passed through a flow straightener 26 and flows downward engulfing the jet stream 34 of droplets. A secondary stream of gas 32 flows through a small orifice 30 concentric with the aerosol 34 to disperse the droplets and prevent coagulation. Suitable gases used in the process include nitrogen or other inert gases.

At the bottom of the thermal reactor 20 a virtual impactor stage 38 aids in the collection of dry particles and eliminates small submicron-size particles that may form by various mechanisms such as condensation of vapors. A sampling filter stage 40 may be incorporated at the bottom of the thermal reactor 20 which is useful for inspecting the quality of the particle yield. Furthermore, a sieving step may optionally be included to isolate particles in a predetermined size range.

As discussed above, the spherical polymer particles produced in accordance with the invention may be monodisperse (uniformly sized) or polydisperse (different sizes). Polydisperse particles may be produced by essentially uncontrolled aerosol generation. However, the production of monodisperse particles requires controlled aerosol generation as is described below.

Monodispersion of the droplets can be accomplished by adjusting the liquid feed flowrate and finely tuning the oscillation frequency. Theoretically, it has been derived elsewhere that the range of lengths of the wavelength for exitation to achieve monodispersivity, λ, in micrometers is:

$$3.5D_j < \lambda < 7D_j$$

where λ is the wavelength of excitation. In practice, fine tuning within this range is required to determine the exact frequency window. Thus, a quartz observation window 42 may be mounted on the top of the thermal reactor 20 to facilitate monitoring of the operation and uniformity of the aerosol 34 and to check for monodispersitivity of the droplets. A small gas jet or test jet 46 may be used to in combination with the quartz observation window 42 to visually check for monodispersitivity of the droplets. The test jet 46 impinges perpendicularly to the aerosol jet stream 34, and droplets of equal size deflect at the same angle while polydisperse droplets deflect at a multitude of angles (satellites). Adjustments to the flow rate and frequency may be made to facilitate monodispersion as discussed above.

The following examples serve to further illustrate the invention.

EXAMPLE #1

An aerosol of commercially available polystyrene (Styron 686-D, Dow Chemical) dissolved in toluene was generated in the thermal reactor. Solutions of 1 part of polystyrene in 40 parts of toluene were used in conjunction with a 75 μm orifice, a flowrate of 1.6 cc/min and an excitation frequency of 17 kHz. The inert gas (nitrogen) flowrates in the reactor were approximately 1 lpm dispersion and 2.5 lpm dilution. The maximum wall temperature at the upper section of the thermal reactor was 300° C. and that of the lower section was 400° C. The total residence time of the droplets/particles in the reactor was calculated to be in the order of 8 seconds.

Figure 4A:
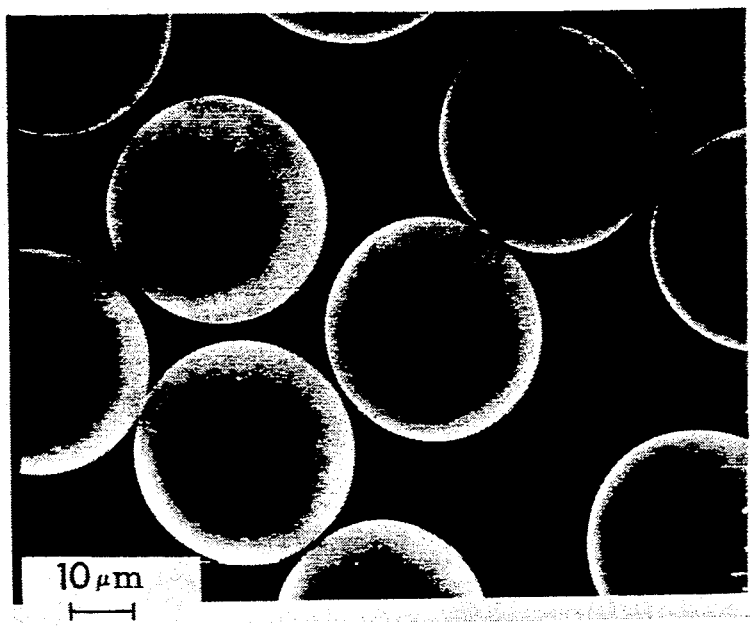
Figure 4B:
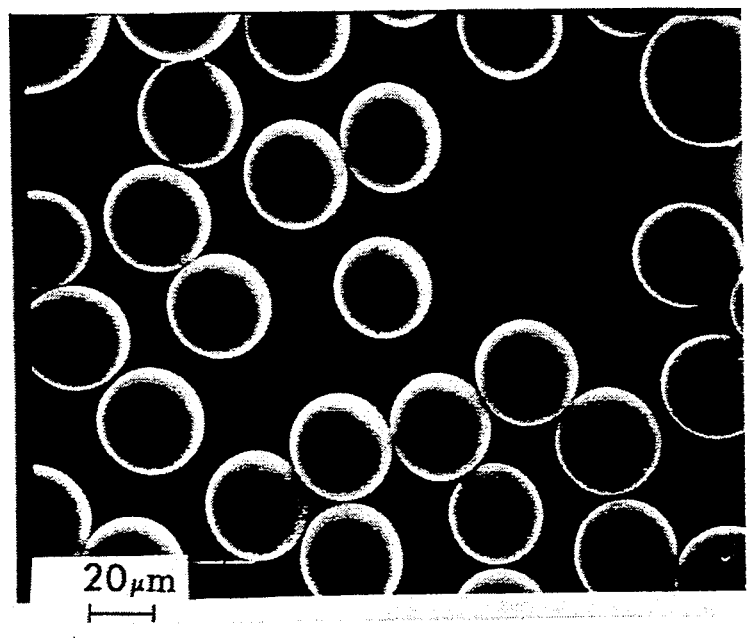

Collected particles were spheres having a diameter of approximately 33 $\mu$m as determined by optical and SEM microscopy shown in FIGS. 4a and 4b. Any larger particles formed by fusion to two or three particles while still liquid (doublets shown in the left side of FIG. 4b, or triplets) were separated out by subsequent sieving.

Dissolution of poly(styrene) beads in toluene required a few hours at room temperature and sonication prior to atomization in order to achieve uniform mixing. Insufficient mixing resulted in bubble formation. Furthermore, solutions thicker than 40:1 toluene to polystyrene were too viscous to handle properly to produce monodisperse particles. Extensive testing for monodispersitivity of the droplets was done at the onset of each experiment using the test jet described above. Optimum conditions for the reactor temperature and flow characteristics were determined by numerical modelling using a "FLUENT" software package (Creare, 1989)

EXAMPLE #2

Production of polystyrene particles of approximately 60 $\mu$m in diameter was achieved by generating an aerosol of partially polymerized styrene monomer. The monomer was mixed with benzoyl peroxide (2% by weight) and was heated at 84° C., in a nitrogen atmosphere for 20 minutes. Production was conducted by feeding this mixture, dissolved in toluene 50-50 by mass, to the generator. Atomization conditions were similar to those described in Example 1, with the exception of temperature, which was optimized for the monomers. The temperature profile in the reactor was controlled to prevent flash-vaporization of the monomer. Thus, the top section of the reactor was set at a low temperature (240° C.) to provide slow initial heat-up, and the bottom section was hot enough (300° C.) to allow for the polymerization reactions to proceed to completion. The total residence time in the reactor for these drops/particles was calculated to be 7 seconds.

EXAMPLE #3

Solutions of 2% poly(methyl methacrylate) in acetone were atomized by the aerosol generator. The orifice, the flowrate, and the excitation frequency were the same as that described in Example 1. The flowrates in the reactor, the residence time, and the wall temperatures in the reactor were also the same as that described in Example 1. Batches of poly(methyl methacrylate particles of 30 $\mu$m in diameter were produced and collected from the bottom of the thermal reactor.

EXAMPLE #4

Figure 5:
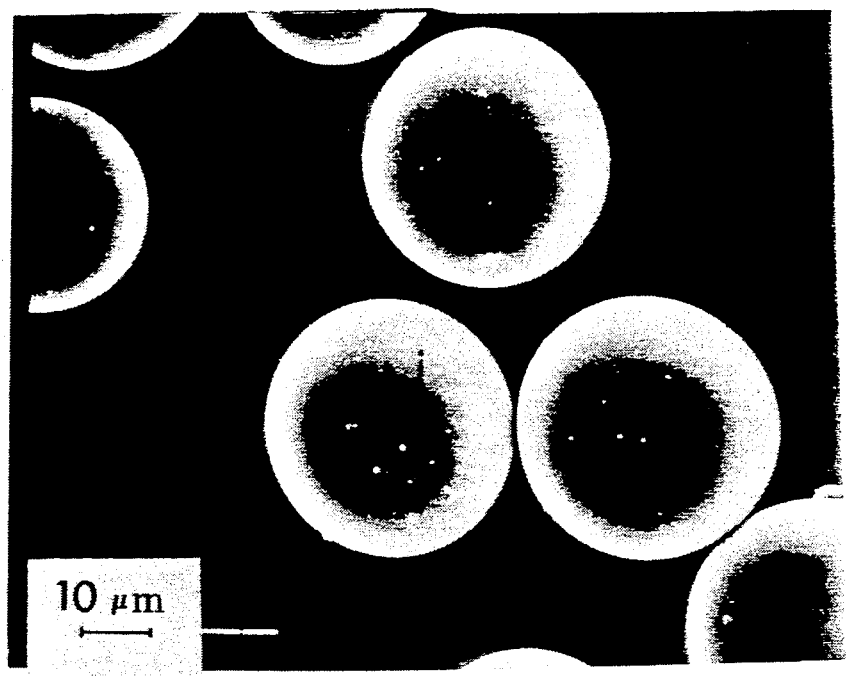

Methyl-methacrylate was pre-polymerized in bulk using benzoyl peroxide (2% by weight) as initiator. The polymerization was carried out at 75° C. for 15 minutes resulting in a partially reacted, medium viscosity liquid. This was then dissolved in acetone at a ratio of 2:1 (acetone to polymer) and conducted to the aerosol generator. The polymerization was then completed in the thermal reactor. Both heating stages were set at a wall temperature of 280° C. Collected particles were spherical having a diameter of approximately 45 $\mu$m as determined by optical and SEM microscopy shown in FIG. 5.

Elemental analysis of the produced powders revealed the same C/H ratio as the theoretically expected C/H ratio, calculated from the chemical formula.

EXAMPLE #5

Figure 6:
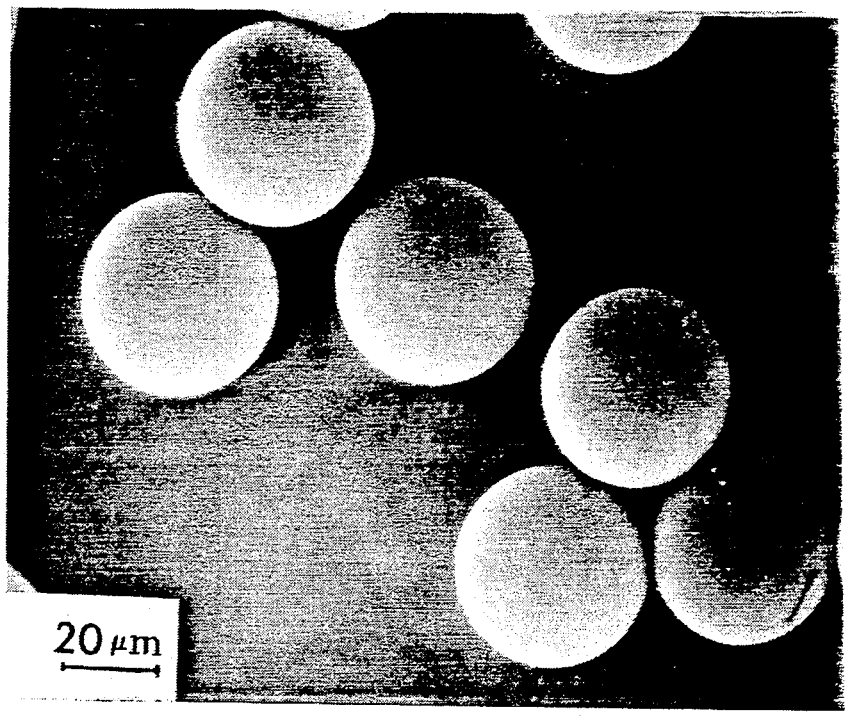

Solutions of 4.5% poly(vinyl acetate) in acetone were atomized by the aerosol generator. The orifice, the flowrate, and the excitation frequency were the same as that described in Example 1. The gas (nitrogen) flowrates in the reactor were approximately 1 lpm dispersion and 2.5 lpm dilution. The maximum wall temperature at the upper section of the thermal reactor was 300° C. and that of the lower section was 300° C. The total residence time of the droplets/particles in the reactor was calculated to be in the order of 8 seconds. Collected particles were spheres having a diameter of approximately 40 $\mu$m as determined by optical and SEM microscopy shown in FIG. 6.

EXAMPLE #6

A solution of 100 parts styrene, 5 parts divinyl benzene, and 2 parts benzoyl peroxide by mass was prepolymerized in bulk at 84° C. for 16 minutes. The mixture was then dissolved in toluene (1 part of polymer to 3 parts of toluene by mass). The solution was then conducted to the aerosol generator and atomized into the reactor. The orifice, the flowrate, and the excitation frequency were the same as in Example #1. The gas (nitrogen) flowrates in the reactor were approximately 1 lpm dispersion and 2.5 lpm dilution. The upper and lower stages of the reactor were both set at 300° C.

Batches of crosslinked poly(styrene) particles having a particle size of 45 $\mu$m were collected from the reactor.

The invention is not to be limited by what has been particularly shown and described except as indicated by the appended claims.

What is claimed is:

1. A method for producing spherical polymer particles comprising the steps of:
   preparing a liquid feed solution comprising monomer and polymerization catalyst;
   conducting said liquid feed solution into an aerosol generator;
   generating an aerosol in the form of droplets;
   spraying said aerosol into a thermal reactor heated to a predetermined temperature profile above 150° C.;
   maintaining said aerosol in said thermal reactor for a period of time sufficient to allow said monomer to polymerize and solidify; and
   collecting the resultant spherical and solid polymerized particles.

2. The method of claim 1 wherein in said generating step, said aerosol generation is controlled and said droplets are monodisperse.

3. The method of claim 1, wherein in said generating step, said aerosol generation is uncontrolled and said droplets are polydisperse.

4. The method of claim 1, wherein said monomer comprises any liquid monomer or mixtures of monomers whose polymerization in bulk can be readily controlled.

5. The method of claim 4, wherein said monomers are styrene, methyl methacrylate, acrylic acids, vinyl acetate, divinyl acetate, divinyl benzene, or mixtures thereof.

6. The method of claim 1, wherein said polymerization catalyst is benzoyl peroxide, or potassium persulfate.

7. The method of claim 1, wherein said feed solution further comprises a solvent.

8. The method of claim 7, wherein said solvent is toluene, acetone, benzene, butanone, water, methanol, ethanol or hexane.

9. The method of claim 2, wherein said conducting step includes forcing said liquid feed solution through a small orifice in said aerosol generator while simultaneously oscillating said feed solution at a predetermined high frequency and maintaining a predetermined liquid feed rate and polymer dilution rate.

10. The method of claim 9, wherein in said generating step, the monodispersitivity and size of said droplets is controlled by adjusting the size of said orifice, the frequency of the oscillation, the liquid feed rate, and the polymer to solvent dilution ratio.

11. The method of claim 1, wherein said thermal reactor is an externally heated thermal reactor having at least one stage.

12. The method of claim 11, wherein said thermal reactor is capable of being heated to a predetermined temperature profile.

13. The method of claim 12, wherein said predetermined temperature profile is in the range of about 150°–450° C.

14. The method of claim 2, wherein said thermal reactor further comprises a quartz observation window to facilitate monitoring the monodispersitivity of the droplets in said aerosol jet.

15. The method of claim 1, wherein in said maintaining step, said monomers polymerize by condensation polymerization.

16. The method of claim 1, wherein in said maintaining step, said monomers undergo a crosslinking reaction.

17. The method of claim 1, wherein in said maintaining step, said period of time is in the range of about 3–20 seconds.

18. The method of claim 1, wherein in said collecting step, said thermal reactor includes a virtual impactor stage for eliminating any generated ultra-fine particles.

19. The method of claim 18, wherein in said collecting step, said thermal reactor further includes a sampling filter stage for inspecting the quality of the particle yield.

20. A method for producing spherical thermoplastic polymer particles comprising the steps of:
preparing a liquid feed solution comprising a thermoplastic polymer dissolved in a solvent;
conducting said liquid feed solution into an aerosol generator;
generating an aerosol in the form of droplets;
spraying said aerosol into a thermal reactor heated to a predetermined temperature profile above 150° C.;
maintaining said aerosol in said thermal reactor for a period of time sufficient to allow said solvent to evaporate and said droplets to solidify; and
collecting the resultant solid spherical thermoplastic particles.

21. The method of claim 20 wherein in said generating step, said aerosol generation is controlled and said droplets are monodisperse.

22. The method of claim 20 wherein in said generating step, said aerosol generation is uncontrolled and said droplets are polydisperse.

23. The method of claim 20, wherein said thermoplastic polymer is any thermoplastic polymer that can be completely dissolved in a solvent.

24. The method of claim 20, wherein said thermoplastic polymer is poly(styrene), poly(methyl methacrylate), poly(methyl ethacrylate), acrylic resins, poly(vinyl-acetate), poly(butadiene), poly(esters) (uncrosslinked), formaldehyde resins, gelatins, poly(ethylene terephthalate), or poly(vinyl chloride).

25. The method of claim 20, wherein said solvent is toluene, acetone, benzene, butanone, water, methanol, ethanol or hexane.

26. The method of claim 20, wherein said conducting step includes forcing said liquid feed solution through a small orifice in said aerosol generator while simultaneously oscillating said feed solution at a predetermined high frequency and maintaining a predetermined liquid feed rate and polymer to solvent dilution ratio.

27. The method of claim 26, wherein in said generating step, the monodispersitivity and size of said droplets is controlled by adjusting the size of said orifice, the frequency of said oscillation, the liquid feed rate and the solvent to polymer dilution ratio.

28. The method of claim 20, wherein said thermal reactor is an externally heated thermal reactor having at least one stage.

29. The method of claim 28, wherein said thermal reactor is capable of being heated to a predetermined temperature profile.

30. The method of claim 29 wherein said predetermined temperature profile is in the range of about 150°–450° C.

31. The method of claim 21, wherein said thermal reactor comprises a quartz observation window to facilitate monitoring the monodispersitivity of the droplets in said aerosol.

32. The method of claim 20, wherein in said maintaining step, said time period is in the range of 3–20 seconds.

33. The method of claim 1, wherein said aerosal generator comprises a multi-orifice plate used to enhance the yield of said resultant polymer particles per unit time.

34. The method of claim 20 wherein said aerosal generator comprises a multi-orifice plate used to enhance the yield of said resultant polymer particles per unit time.

35. The method of claim 1, wherein the monomer in said liquid feed solution is partially polymerized.

36. The method of claim 1, further comprising the step of sieving said collected particles.

37. The method of claim 20, further comprising the step of sieving said collected particles.

38. The method of claim 1, wherein in said maintaining step said monomers polymerize by addition polymerization.

* * * * *